Figure 1:
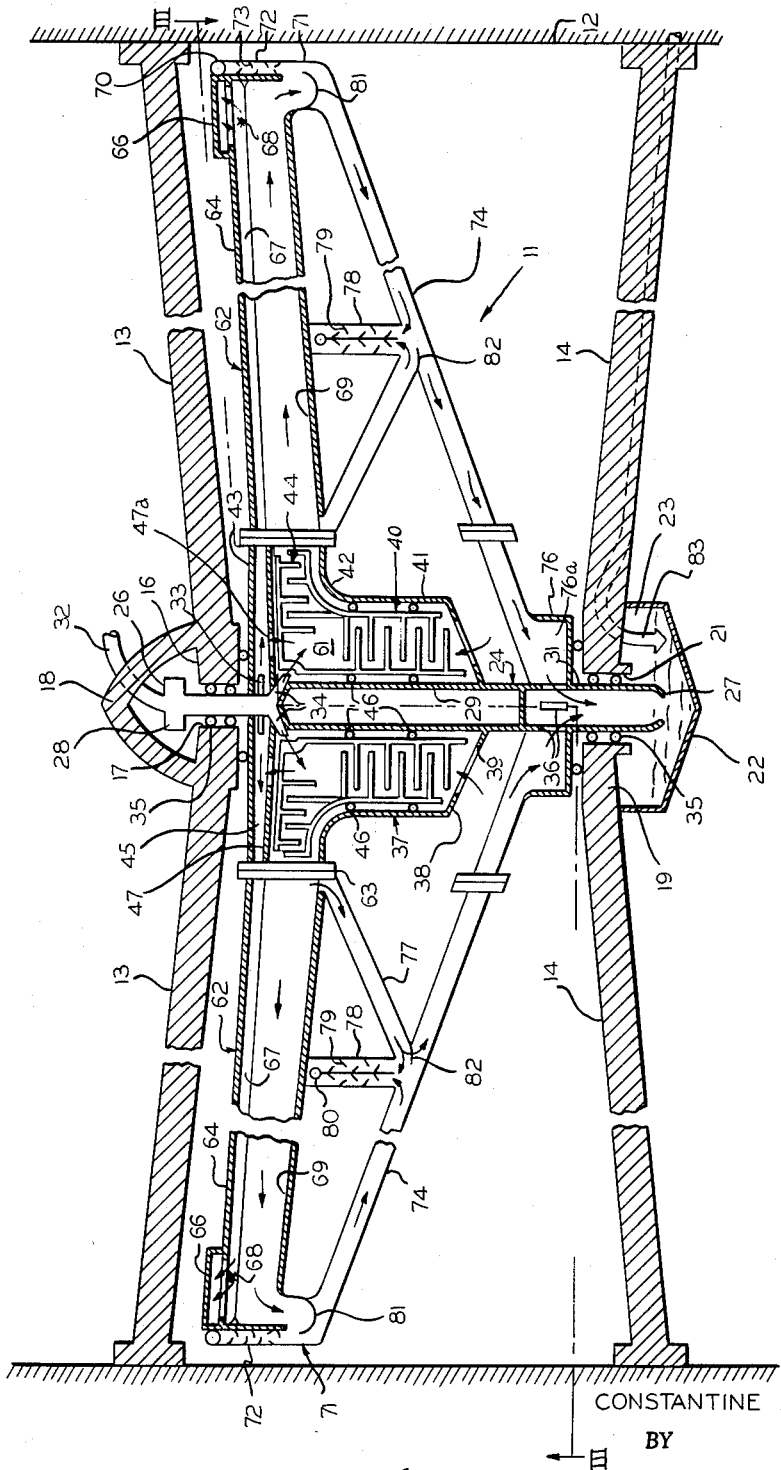

Sept. 7, 1965  C. A. SERRIADES  3,204,401
JET PROPELLED VAPOR CONDENSER
Filed Sept. 9, 1963  2 Sheets-Sheet 1

INVENTOR.
CONSTANTINE A. SERRIADES
BY
ATTORNEYS

Sept. 7, 1965 C. A. SERRIADES 3,204,401
JET PROPELLED VAPOR CONDENSER
Filed Sept. 9, 1963 2 Sheets-Sheet 2
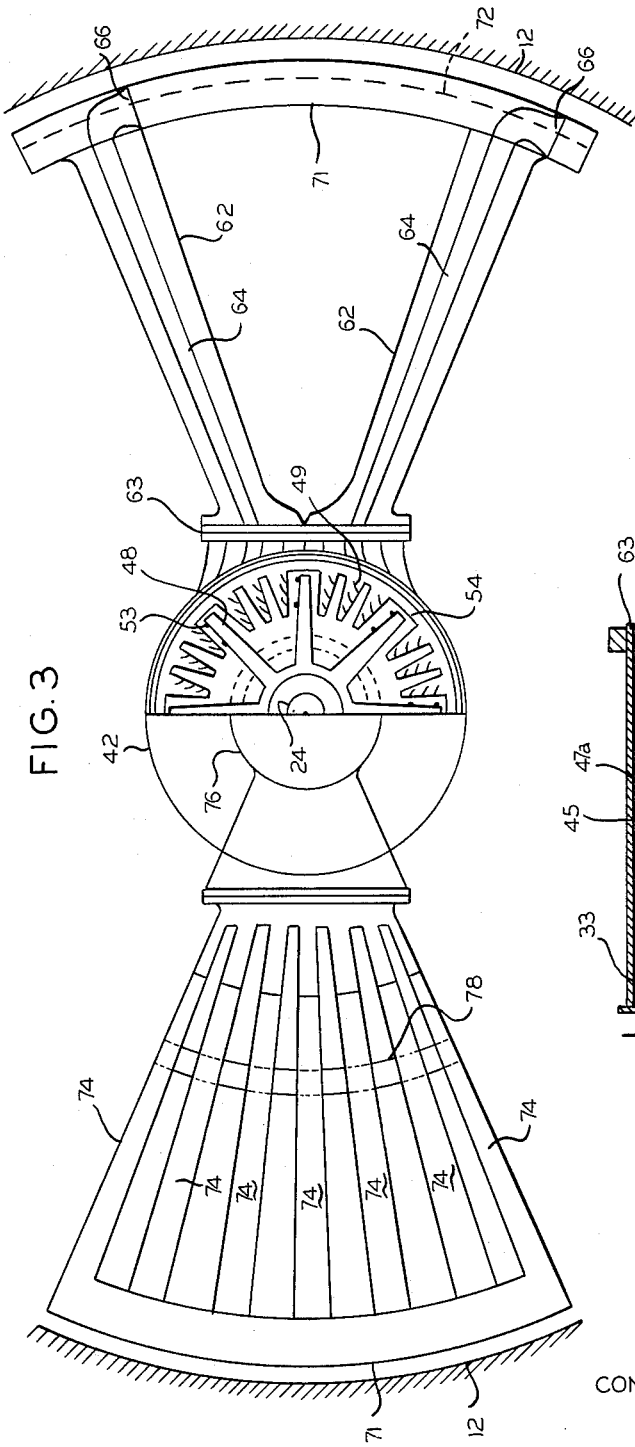
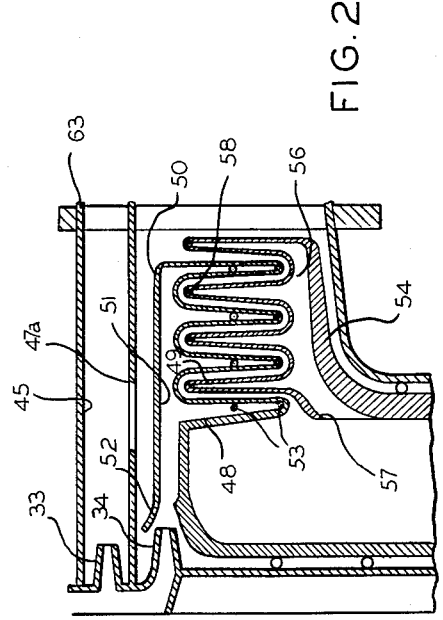
INVENTOR.
CONSTANTINE A. SERRIADES
BY
ATTORNEYS

United States Patent Office 3,204,401
Patented Sept. 7, 1965

3,204,401
JET PROPELLED VAPOR CONDENSER
Constantine A. Serriades, 3950 N. Lake Shore Drive,
Chicago, Ill.
Filed Sept. 9, 1963, Ser. No. 307,444
9 Claims. (Cl. 60—31)

This invention generally relates to a vapor condenser and more particularly relates to a vapor condenser for sub- and super-sonic aircraft.

A problem exists in carrying sufficient liquid coolants, such as water, for water injection in the jet aircraft industry. Large storage tanks of the coolant greatly increase the weight of the aircraft and prohibit efficient operation of the aircraft. The greater weight requires greater fuel loads for shorter traveling distances.

The present invention provides a propeller-type vapor condenser which is utilized to condense cooling vapors and supply said cooling vapors to a coolant storage tank which may have a capacity substantially less than the capacity of present cooling tanks because the condenser of the present invention constantly refills the water tank. Also, the propeller-type condenser of the present invention is provided with means to compensate for the weight drag thereof.

Therefore, it is an object of the present invention to provide an improved condenser to condense a vaporized coolant.

It is another object of the present invention to provide a propeller-type condenser which condenses vaporized coolant and also provides a lifting force to compensate for the weight thereof.

It is another object of the present invention to provide a propeller-type vapor condenser which may be utilized in an aircraft to manufacture and supply the aircraft with a liquid coolant.

It is another object of the present invention to provide a propeller-type vapor condenser for utilization on an aircraft to manufacture and supply the aircraft with a liquid coolant wherein the vapor condenser compresses atomspheric air and ignites the air with a hydrocarbon fuel to provide water vapor and condenses the vapors of the ignited hydrocarbon fuel to manufacture water therefrom and circulating air around the outer surfaces of the condenser.

It is still another object of the present invention to provide a propeller-type vapor condenser utilizing a propeller shape vapor condenser to provide an upward lifting force for the entire vapor condenser in order to compensate for the weight thereof.

It is still another object of the present invention to provide a propeller-type vapor condenser which utilizes a hollow propeller shaped condenser to condense vapors therein while simultaneously acting as a propeller to provide lifting forces and to provide circulating cooling air and where, in the hollow interior of the vapor condenser, atmospheric air is compressed and ignited with a suitable fuel.

It is still another object of the present invention to provide a propeller-type vapor condenser that manufactures coolant for aircraft and contains contrarotating hollow turbine blades which act as fuel supply conduits and turbine cooling means.

Other features and objects of the present invention will become apparent to those skilled in the art after a careful consideration of the following detailed description when considered in conjunction with the accompanying drawings wherein like reference numerals and characters refer to like and corresponding parts throughout the several views.

On the drawings:
FIGURE 1 is a partial longitudinal cross-sectional view with parts in elevation of the vapor propeller-type vapor condenser constructed in accordance to the principles of the present invention;
FIGURE 2 is an enlarged partial cross-sectional view with parts in elevation of the turbine blades manufactured in accordance to the principles of the present invention as illustrated in FIGURE 1; and
FIGURE 3 shows a bottom transverse cross-sectional view with parts in elevation taken along lines III—III of FIGURE 1.

As shown on the drawings:
The propeller type condenser of the present invention is contained within a housing which is adapted to be fastened within the fuselage of a sub- or super-sonic aircraft. The condenser has a central vertical hollow shaft which is freely and centrally rotatably mounted to the housing. The central shaft has connected thereto an axial air compressor with contrarotating blades which are rotated by their respective turbine blades. The turbine blades are of a hollow construction with nozzle outlets thereon. One set of hollow rotating turbine blades have the compressed air from the compressor passing therethrough. The other set of hollow rotating turbine blades are utilized to direct the fuel and compressed air into an ignitable composition between the two sets of turbine blades wherein it is ignited. The turbine blades having suitable air vanes thereon are thus rotated by the combustion gases of the ignited fuel and air mixture.

Connected to the turbine housing are a plurality of hollow propeller-type blades. Adjacent blades are interconnected at their peripheral ends by a hollow structure. The blades have hollow conduits connected to their ends and leading downwardly therefrom to the bottom portion of the central shaft and into the hollow portion thereof. Attached to the ends of the hollow blade and the conduits are a plurality of condenser plates.

The combustion gases comprise a plurality of constituents one of which is vaporized water. The combustion gases are directed through the hollow propellers of the vapor condenser to the end thereof wherein the gases contact the condenser plates and are cooled thereby to thus condense the water vapor. The condensed water vapor then passes into the hollow portion of the central shaft to a water collection tank. Also, the fuel and compressed air are ignited in a second hollow portion of the propellers to provide a force to rotate the propellers. The propellers and their respective conduits are vane shaped such that they create an upward force and thereby supply a certain amount of lifting force. This lifting force is used to compensate for the weight of the condenser of the present invention. Further, the propeller vanes are utilized to circulate air within the condenser to provide a cooling medium for the conduits and various parts of the condenser of the present invention.

Referring to FIGURES 1 and 3, there is illustrated a propeller-type condenser 11. The condenser is rotatably supported in a housing 12 by a plurality of top and bottom spider support bars 13 and 14. The spider bars 13 are suitably affixed at one end thereof to the interior of the housing 12 and decline radially inwardly therefrom to an upper central spider hub 16 forming a central circular opening 17.

Attached to the outer surface of the hub 16 is an upper ogive housing 18. The ogive housing will face the upper opening of the housing in the fuselage of the sub or supersonic aircraft.

The support bars 14 are attached at one end thereof to the interior of the housing 12 and incline radially inwardly therefrom to a bottom central spider hub 19 forming a central circular opening 21 therethrough. The openings 17 and 21 are concentric with one another.

A lower or supply housing 22 forming a condensed vapor supply chamber 23 is attached to the bottom surface of the lower hub 19.

A hollow shaft 24 extends through the openings 17 and 21 with an upper end 26 extending into the upper housing 18 and a lower end 27 extending into the lower housing 22. The shaft 24 has a top section 28, a middle section 29 and a bottom section 31. The top section 28 is hollow and has journaled in its top end 26 a fuel feed conduit 32. The lower portion of the top shaft section has two sets of fuel nozzles 33 and 34 connected thereto. The sets of fuel nozzles 33 and 34 are adapted to deliver fuel to the condenser from the fuel conduit 32 which is suitably connected to a supply of fuel. The upper shaft portion is journaled in the opening 17 by suitable bearings 35.

The central shaft portion 29 has solid end walls separating it from the top and bottom shaft portions. The central portion is preferably hollow to reduce the overall weight of the condenser as much as possible.

The bottom shaft portion 31 is journaled in the opening 21 by suitable bearings 35 and is hollow with an open lower end 27. A plurality of rectangular ports 36 are formed in the lower shaft portion. The ports 36 communicate the interior of the condenser with the supply chamber 23 to deliver condensed vapor from a collection chamber 76a, formed by the collection housing 76, to the supply chamber 23, as will be described in greater detail hereinafter.

The condenser 11 is situated between the supports 13 and 14. The condenser has a cylindrical housing 37 suitably fixed to the shaft 24. The housing has a conical bottom wall 38 forming a circular passage 39 therethrough, a cylindrical lower body wall 41 extending upwardly from the bottom wall 38, a stepped enlarged cylindrical upper body wall 42 joined to the lower body wall and a circular top wall 43. The housing 41 contains an axial flow compressor 40 in the lower body wall portion and a radial flow turbine 44 integral with the compressor. Both the compressor and turbine have two sets of contrarotating blades. The compressor has suitable bearings 46 rotatably connecting the compressor blades to the inner surface of the wall 41 and the central shaft portion 29.

The upper shaft portion and nozzles 33 and 34 extend into the housing portion formed by the stepped cylindrical wall 42. A circular wall 47 having a circular passage 47a formed therethrough is attached to the upper shaft portion 28, between the two sets of nozzles, and the wall 42.

Referring to FIGURE 2, the turbine 44 has two sets of hollow blades 48 and 49 having air-foil vane shape (not shown) to rotate the blades in opposite directions. The hollow set of turbine blades 48 extend from a hollow support 50 affixed to one set of compressor blades. The hollow support 50 forms a fuel manifold 51 that has an open end 52 facing the set of fuel nozzles 34 and branch openings leading to the interior of the turbine blades 48. The turbine blades 48 each have a plurality of nozzle openings 53 formed therein.

The other hollow set of rotating turbine blades 49 extend from a hollow support 54 and are affixed to the other set of the compressor blades. The hollow support 54 forms a compressed air manifold 56 having an open end 57 facing the compressor exit and branch openings leading to the interior of the turbine blades 49 to cool the blades. The turbine blades 49 each have a plurality of nozzle openings 58 formed therein in order to continually circulate cooling compressed air therethrough. The turbine blade nozzle openings 53 are sized to deliver fine streams of predetermined amounts of fuel to compressed air. The fuel and compressed air are ignited, by suitable spark means (not shsown), in a combustion chamber 61 leading to the turbine and between two sets of turbine blades. The combustion gases and compressed air are utilized to rotate the turbine which in turn rotates the compressor blades.

The nozzles 53 all face in the same direction in order to give a turning force in one direction to the turbine blades 48. The hot flame from the nozzles 53 and combustion gases impinge on the turbine blades 49 to rotate them in a direction opposite the turbine blades 48. Also, since the turbine blades 49 receive a greater amount of hot gases, it is desirable to have a greater number of them so that they may be effectively cooled by the compressed air that passes through them.

Referring to FIGURES 1 and 3, there is attached to the top wall portion 42 adjacent the turbine outlet a plurality of radially extending hollow propeller blades 62. The propellers 62 are suitably attached by means 63 to the housing top stepped portion of the housing 37. The propeller vane has a conduit 64 embedded in the top surface thereof and extending substantially to the end thereof and has a raised nozzle shape outlet 66. The conduit 64 forms a passageway 67 which communicates with the passage 45 to deliver fuel and compressed air to the nozzle 66. The fuel and compressed air are ignited by suitable spark means 68 to provide combustion gases which are exited through the nozzle 66. The exiting nozzle gases provide a propelling force for the propeller blades. The propeller blades have an air-foil vane shape and when rotating act as a helicopter propeller to cause a lifting force as well as acting as a fan blade to circulate air throughout the interior of the housing 12.

The remaining hollow portion of the propeller blades forms a passage 69 which communicates with the turbine exit and receives the ignited mixture exiting therefrom. The ends of adjacent blades are interconnected by a hollow rectangular housing 71. Connected between the end wall of rectangular housing 71 and the end of the propeller blades 62 is a vapor condenser column 72. The condenser column 72 has bleed outlets 70 for exiting non-condensible gases and a plurality of condenser plates 73 and extends substantially the entire length of the housing end wall. The condenser plates cools the combustion gases to condense the water vapor therein.

A plurality of conduits 74 are connected to the bottom portion of the housing 71 and lead to a cylindrical collection housing 76 that is affixed to the lower portion of the shaft 24. The conduits 74 also have attached thereto a plurality of branch support conduits 77 that direct gases from the passageway 69 to the conduits 74. An auxiliary vertical condenser 78 having bleed outlets 80 for exiting non-condensible gases and a plurality of condenser plates 79 is connected between the branch conduits 77 and the conduits 74. The conduits 77 and 74 are all vane-shaped so as to aid in the rotation of the condenser.

A directing plate 81 is placed at the end of the passage 69 adjacent the entrance of the condenser column 72 to direct combustion gases flowing through the passage 69 into the vertical condenser 72. Likewise, the support conduits 77 have connected to their exit ends a directing means 82 for directing a portion of the combustion gases traveling therethrough into the vertical condenser 78.

There are illustrated four hollow propeller blades 62 with two propeller blades being adjacent and connected to each other by the rectangular housing 71. Each pair of joined blades are diametrically opposed so as to render centrifugal balance to the unit of the present invention. Further, each pair of joined propeller blades has a plurality of delivery conduits 74 extending therefrom. The purpose of having a numerous amount of delivery conduits is to provide greater amount of surface area to cool the combustion gases and thereby condense the water vapor therein. The supply conduits may also be provided with bleed outlets (not shown) to exit the combustion gases that are not condensed. Also, it is of course understood, that the number of blades and delivery conduits as well as condensing columns may be different than that illustrated, the number being in accordance to that desired for a particular type of aircraft.

In operation, atmospheric air is drawn through the ports 39 into the compressor 40 where it is compressed. Fuel is delivered by the fuel conduit 32 and injected by the nozzles 33 and 34 into the circular passage 45 and hollow turbine blades 48. The hollow turbine blades spray the fuel in a fine stream into the combustion chamber 61 and between the turbine blades 48 and 49. The compressor delivers compressed air to the combustion chamber 61, to the passage 45 through the outlet 47a, and into the turbine blades 49. The fuel and compressed air are mixed and ignited by suitable means. The combustion gases are utilized to rotate the turbine and thereby rotate the corresponding blades of the axial compressor 40. The combustion gases are directed from the turbine into the interior of radially extending propeller blades 62 and along the hollow passage 69 thereof. Also, the fuel and compressed air mixture in the passage 45 is delivered into the conduit 64 wherein it is ignited and exited through exhaust nozzles 66 to propel and turn the blades 62 that in turn rotate the entire condenser structure.

As the structure is rotated, the outer atmosphere air is being circulated around the outer surfaces thereof to provide cooling thereof. The combustion gases within the passage 69 are directed to the support conduits 77 and by the direction blade 82 into the vertical condenser 78. The delivery conduit 74 is connected to the condenser column 78 to receive condensed vapor therefrom. The passage 69 has a direction blade 81 to direct combustion gases from the passage 69 into the condenser column 72. The conduits 74 are connected to the condenser column 72 to receive condensed vapor therefrom. The conduits 74 interconnect the condensers 72 and 78 with cylindrical housing 76 which is attached to the lower shaft portion 31. The cylindrical collection housing 76 communicates with the lower shaft openings 36 and delivers condensed water vapor thereto. The water vapor is then delivered into the supply housing 22. The water then may be taken from the supply housing by suitable conduit means 83 and delivered to the aircraft water storage tanks and from there utilized as needed, for example, to cool the jet engines.

Therefore, it is seen where I have provided a condenser which will provide aircraft with means for obtaining an adequate water supply without the necessity of carrying a large amount of initial water supply. The condenser of the present invention manufactures the water during the flight of the aircraft by utilizing atmospheric air and a suitable fuel.

Although the fuel I utilize is a fuel that, when ignited with air, reacts to form water vapor, it is of course understood that any fuel that reacts to form a low boiling point cooling material that may be condensed and used as a coolant may be utilized in accordance to the principles of the present invention.

It will be understood that the above embodiment of my invention has been used for illustrative purposes only and that other modifications and variations in the present invention may be effective without departing from the spirit and scope of the invention as set forth in the hereunto appended claims.

I claim as my invention:

1. A jet propelled propeller-type vapor condenser mechanism comprising:
    a housing adapted to be fastened to an aircraft body,
    a top support being affixed to the housing,
    a lower support longitudinally spaced from the top support and being affixed to the housing,
    a jet propelled propeller-type vapor condenser being between the upper and lower supports and being rotatably journaled thereto,
    a supply housing forming a supply chamber being attached to the lower support,
    said vapor condenser having
        two sets of axially spaced fuel nozzles,
        means for supplying fuel to the fuel nozzles,
        a collection housing forming a collection chamber being adjacent said lower support,
        a cylindrical housing having an upper portion with a top wall and a lower portion with a bottom wall,
        an axial compressor having contrarotating blades being rotatably connected to the interior of the housing lower portion,
        means to supply air to the axial compressor,
        a radial turbine within the housing upper portion, said radial turbine having two sets of hollow contrarotating turbine blades having nozzles thereon,
        a fuel supply manifold communicating with the interior of one set of hollow turbine blades,
        a compressed air supply manifold communicating with the interior of the other set of hollow turbine blades,
        said turbine blades being suitably attached to the compressor blades to rotate said compressor blades,
        said fuel manifold being in communication with one set of fuel nozzles to receive fuel therefrom,
        said compressed air manifold being in communication with the compressor exit to receive compressed air therefrom,
        combustion chambers being formed by the housing adjacent to the entrance of the turbine and between the turbine blades,
        means to feed fuel and compressed air to the combustion chambers,
        means forming a fuel passage,
        means communicating the other set of fuel nozzles with said fuel passage,
        means to direct compressd air from the condenser to the fuel passage,
        a plurality of hollow propeller blades affixed to and radially extending from the upper portion of the housing and being connected thereto to receive combustion gases from the turbine,
        an exhaust nozzle conduit connected to each of said hollow propeller blades and extending substantially the length thereof and connected to the housing to receive gases from the fuel passage,
        an exhaust nozzle attached to the end of the nozzle conduit to exhaust combustion gases and thereby rotate the propeller blades,
        a plurality of hollow condenser housings interconnecting the ends of adjacent propeller blades, a condenser column having condenser plates therein being formed by said condenser housing and extending the length thereof,
        means to direct gases from the hollow propeller blades into the condenser columns,
        a plurality of delivery conduits being connected between the condenser housing and the collection housing to deliver condensed vapor from the condenser column to the collection chamber, and means to deliver condensed vapor from the collection chamber to the supply chamber,
    whereby the entire propeller-type condenser is rotated between the upper and lower supports to provide circulating cooling air while condensing vapor therein to provide a liquid coolant to be used for cooling purposes on the aircraft.

2. A jet propelled propeller-type vapor condenser mechanism comprising:
    a housing adapted to be fastened to an aircraft body,
    a top support being affixed to the housing,
    a lower support longitudinally spaced from the top support and being affixed to the housing, a jet propelled propeller-type vapor condenser being between the upper and lower supports and being rotatably journaled thereto,
a supply housing forming a supply chamber being attached to the lower support,
said vapor condenser having
a plurality of axially spaced fuel nozzles for supplying fuel to the nozzles,
a collection housing,
a cylindrical housing,
an axial compressor having contrarotating blades being rotatably connected to the interior of the cylindrical housing,
means to supply air to the compressor,
a radial turbine within the cylindrical housing and being suitably attached to the compressor to rotate the compressor,
said radial turbine having hollow contrarotating turbine blades having nozzles thereon,
a fuel supply manifold communicating with the interior of some of the hollow turbine blades,
a compressed air supply manifold communicating with the interior of the other hollow turbine blades,
said fuel manifold feed passage being in communication with fuel nozzles to receive fuel therefrom,
said compressed air manifold being in communication with the compressor exit to receive compressed air therefrom,
combustion chambers being formed by the cylindrical housing adjacent the entrance of the turbine and between the turbine blades,
means to feed fuel and compressed air to the combustion chambers,
means forming a fuel passage,
means communicating the fuel nozzles with said fuel passage,
means to direct compressed air from the condenser to the fuel passage,
a plurality of hollow propeller blades affixed to and radially extending from the cylindrical housing and being connected thereto to receive combustion gases from the turbine,
an exhaust nozzle connected to the housing to receive gases from the fuel passage,
a plurality of condenser housings interconnecting the ends of adjacent propeller blades,
said condenser housing having condenser plates therein, means to direct gases from the hollow propeller blades into the condenser housing,
a plurality of delivery conduits connected between the condenser housing and the collection housing to deliver condensed vapor therefrom to the collection chamber, and
said exhaust nozzle having means to provide a combustion chamber to ignite fuel and air therein with the combustion gases being exhausted through the exhaust nozzle to rotate the hollow propeller blades
whereby the entire propeller-type condenser is rotated between the upper and lower supports to provide circulating cooling air while condensing vapor therein to provide a liquid coolant to be used for cooling purposes on the aircraft.

3. A jet propelled propeller-type vapor condenser mechanism comprising:
a first housing adapted to be fastened to an aircraft body,
a top support being affixed to the first housing,
a lower support spaced from the top support and being affixed to the first housing,
a jet propelled propeller-type vapor condenser being between the upper and lower supports and being rotatably journaled thereto,
said vapor condenser having
a plurality of fuel nozzles,
means for supplying fuel to the nozzles, a second housing having an axial compressor and a radial turbine rotatably mounted therein,
combustion chambers being formed by the second housing adjacent the entrance of the turbine and between the turbine blades,
means to feed fuel and compressed air to the combustion chambers,
means forming a fuel passage,
means communicating the fuel nozzles with the fuel passage,
means to direct compressed air from the condenser through to the fuel passage,
a plurality of hollow propeller blades affixed to and radially extending from the second housing and being connected thereto to receive combustion gases from the turbine,
an exhaust nozzle connected to the housing to receive gases from the fuel passage,
a plurality of condenser housings interconnecting the ends of adjacent propeller blades,
said condenser housings having condenser plates therein,
means to direct gases from the hollow propeller blades into the condenser housings, a collection housing,
a plurality of delivery conduits connected between the condenser housing and the collection housing to deliver condensed vapor thereto, and
said nozzle conduit having means to provide a combustion chamber to ignite fuel and air therein with the combustion gases being exhausted through the exhaust nozzle to rotate the hollow propeller blades
whereby the entire propeller-type condenser is rotated between the upper and lower supports to provide circulating cooling air while condensing vapor therein to provide a liquid coolant to be used for cooling purposes on the aircraft.

4. A jet propelled propeller-type vapor condenser mechanism comprising:
a first housing adapted to be fastened to an aircraft body,
a top support being affixed to the first housing,
a lower support spaced from the top support and being affixed to the first housing,
a jet propelled propeller-type vapor condenser being between the upper and lower supports and being rotatably journaled thereto,
said vapor condenser having
a plurality of fuel nozzles,
means for supplying fuel to the nozzles,
a collection housing,
a second housing having a compressor and a turbine rotatably mounted therein,
a combustion chamber being formed by the second housing adjacent to the entrance of the turbine,
means to feed fuel and compressed air to the cumbustion chamber,
a plurality of hollow propeller blades affixed to and radially extending from the housing and being connetced thereto to receive combustion gases from the turbine,
a plurality of condenser housings interconnecting the ends of adjacent propeller blades,
said condenser housings having condenser plates therein,
means to direct gases from the hollow propeller blades into the condenser housings,
a plurality of delivery conduits connected between the condenser housings and the collection housing to deliver condensed vapor thereto, and
means to rotate the hollow propeller blades, whereby the entire propeller-type condenser is rotated between the upper and lower supports to provide circulating cooling air while condensing vapor therein to provide a liquid coolant to be used for cooling purposes on the aircraft.

5. A jet propelled propeller-type vapor condenser mechanism comprising:
- a first housing adapted to be fastened to an aircraft body,
- a top support being affixed to the first housing,
- a lower support spaced from the top support and being affixed to the first housing,
- a jet propelled propeller-type vapor condenser being between the upper and lower supports and being rotatably journaled thereto,
- a supply housing forming a supply chamber,
- said vapor condenser having nozzles,
- a second housing having a compressor and a turbine rotatably mounted therein,
- a combustion chamber formed by the second housing adjacent to the entrance of the turbine,
- means to feed fuel and compressed air to the combustion chamber,
- a plurality of hollow propeller blades affixed to and radially extending from the second housing and being connected thereto to receive combustion gases from the turbine,
- an exhaust nozzle connected to the hollow propeller blades,
- a plurality of condensers connecting the ends of the propeller blades,
- means to direct combustion gases from the hollow propeller blades into the condensers,
- delivery conduits connected between the condensers and the supply housing to deliver condensed vapor therefrom to the supply chamber, and
    - means to deliver combustion gases to the exhaust nozzle to be exhausted therethrough to rotate the hollow propeller blades whereby the entire propeller-type condenser is rotated between the upper and lower supports to provide circulating cooling air while condensing vapor therein to provide a liquid coolant to be used for cooling purposes on the aircraft.

6. A jet propelled propeller-type vapor condenser being between a pair of supports and being rotatably journaled therebetween comprising:
- a central shaft journaled to the supports,
- said shaft having a hollow upper section and a hollow open-end lower section,
- said shaft upper section having formed therein two sets of axially spaced fuel nozzles communicating with the interior thereof and an upper end adapted to have attached thereto a fuel supply conduit for supplying fuel to the nozzles,
- said lower shaft section having formed therein a plurality of ports,
- a collection housing attached to said lower shaft section forming a collection chamber surrounding said ports,
- a stepped cylindrical housing having an enlarged upper portion with a top wall and a smaller diameter lower portion with a bottom wall,
- said stepped housing lower portion bottom wall having an opening to allow air to enter therethrough,
- an axial compressor having contrarotating blades being rotatably connected to the shaft and the interior of the stepped housing lower portion,
- a radial turbine within the stepped housing enlarged portion,
- said radial turbine having two sets of hollow contrarotating turbine blades having nozzles formed therein,
- a fuel supply manifold having a central feed passage communicating with the interior of one set of hollow turbine blades,
- a compressed air supply manifold having a central feed passage communicating with the interior of the other set of hollow turbine blades,
- said turbine blades being suitably attached to the compressor blades to rotate said compressor blades,
- said fuel manifold feed passage being in communication with one set of shaft fuel nozzles to receive fuel therefrom,
- said compressed air feed passage being in communication with the compressor exit to receive compressed air therefrom,
- combustion chambers being formed by the stepped housing adjacent to the entrance of the turbine and between the turbine blades,
- means to feed fuel and compressed air to the combustion chambers,
- a separator wall having a passage formed therethrough and forming a fuel passage between the stepped housing top wall and the turbine blades,
- said separator wall fuel passage communicating with the other set of shaft fuel nozzles,
- means to direct compressed air from the condenser through the annular passage formed by the separator wall,
- a plurality of hollow propeller blades affixed to and radially extending from the enlarged portion of the stepped housing and being connected thereto to receive combustion gases from the turbine,
- an exhaust nozzle conduit connected to the interior of each of said hollow propeller blades and extending substantially the length thereof and connected to the stepped housing to receive gases from the fuel passage,
- an exhaust nozzle attached to the end of the nozzle conduit,
- a plurality of hollow condenser housings interconnecting the ends of adjacent propeller blades so as to provide diametrically opposed condenser housings,
- a condenser column having condenser plates therein being formed by each of said condenser housings and said condenser columns extending the length thereof,
- means to direct combustion gases from the hollow propeller blades into the condenser columns,
- a plurality of delivery conduits to every hollow propeller blade being connected between the condenser housing and the collection housing to deliver condensed vapor from the condenser column in the condenser housing to the collection chamber,
- a plurality of support conduits being connected between the hollow propeller blades and the delivery conduits to tap combustion gases therefrom,
- a plurality of auxiliary condenser columns connected to said delivery conduit to deliver condensed vapor thereto, means to direct combustion gases from the support conduits to the auxiliary condenser, columns, and
- said nozzle conduit having formed therein a combustion chamber to ignite fuel and air therein with the fuel and air combustion gases being exhausted through the exhaust nozzle to rotate the hollow propeller blades whereby the entire propeller-type condenser is rotated between the upper and lower supports to provide circulating cooling air while condensing vapor therein to provide a liquid coolant to be used for cooling purposes on the aircraft.

7. A jet propelled propeller-type vapor condenser being between a pair of supports and being rotatably journaled therebetween comprising:
- a central shaft journaled to the supports,
- said shaft having a hollow upper section and a hollow open-end lower section,
- said shaft upper section having formed therein two sets of axially spaced fuel nozzles communicating with the interior thereof and an upper end adapted to have attached thereto a fuel supply conduit for supplying fuel to the nozzles, said lower shaft section having formed therein a plurality of ports, a collection housing attached to said lower shaft section forming a collection chamber surrounding said ports, a stepped cylindrical housing having an enlarged upper portion with a top wall and a smaller diameter lower portion with a bottom wall, said stepped housing lower portion bottom wall having an opening to allow air to enter therethrough, an axial compressor having contrarotating blades being rotatably connected to the shaft and the interior of the stepped housing lower portion, a radial turbine within the stepped housing enlarged portion, said radial turbine having two sets of hollow contrarotating turbine blades having nozzles formed therein, a fuel supply manifold having a central feed passage communicating with the interior of one set of hollow turbine blades, a compressed air supply manifold having a central feed passage communicating with the interior of the other set of hollow turbine blades, said turbine blades being suitably attached to the compressor blades to rotate said compressor blades, said fuel manifold feed passage being in communication with one set of shaft fuel nozzles to receive fuel therefrom, said compressed air feed passage being in communication with the compressor exit to receive compressed air therefrom, combustion chambers being formed by the stepped housing adjacent to the entrance of the turbine and between the turbine blades, means to feed fuel and compressed air to the combustion chambers, a separator wall having a passage formed therethrough and forming a fuel passage between the stepped housing top wall and the turbine blades, said separator wall fuel passage communicating with the other set of shaft fuel nozzles, means to direct compressed air from the condenser through the annular passage formed by the separator wall, a plurality of hollow propeller blades affixed to and radially extending from the housing and being connected thereto to receive combustion gases from the turbine, an exhaust nozzle connected to the interior of said hollow propeller blades, a plurality of condensers connecting the ends of the propeller blades, means to direct combustion gases from the hollow propeller blades into the condensers, delivery conduits connected between the condensers and the collection housing to deliver condensed vapor therefrom to the collection chamber, means to deliver combustion gases to the exhaust nozzle to be exhausted through the exhaust nozzle to rotate the hollow propeller blades whereby the entire propeller-type condenser is rotated between the upper and lower supports to provide circulating cooling air while condensing vapor therein to provide a liquid coolant to be used for cooling purposes on the aircraft.

8. A jet propelled propeller-type vapor condenser being between a pair of supports and being rotatably journaled therebetween comprising:

a collection housing, a cylindrical housing having a compressor and a turbine rotatably mounted therein, a combustion chamber being formed by the cylindrical housing adjacent to the entrance of the turbine, means to feed fuel and compressed air to the combustion chamber, a plurality of hollow propeller blades affixed to and radially extending from the cylindrical housing and being connected thereto to receive combustion gases from the turbine, an exhaust nozzle connected to the interior of each of said hollow propeller blades and extending substantially the length thereof, an exhaust nozzle attached to the end of the nozzle conduit, a plurality of condenser housings interconnecting the ends of adjacent propeller blades so as to have diametrically opposed condenser housings, a condenser column having condenser plates therein being formed by said condenser housings and extending the length thereof, means to direct gases from the hollow propeller blades into the condenser columns, at least three delivery conduits to every hollow propeller blade being connected between the condenser housings and the collection housing to deliver condensed vapor therefrom to the collection chamber, a plurality of support conduits being connected between the hollow propeller blades and the delivery conduits to tap combustion gases therefrom, a plurality of auxiliary condenser columns connected to said delivery conduit to deliver condensed vapor thereto, means to direct combustion gases from the support conduits to the auxiliary condenser columns, and said nozzle conduit having means to provide a combustion chamber to ignite fuel and air therein with the combustion gases being exhausted through the exhaust nozzle to rotate the hollow propeller blades whereby the entire propeller-type condenser is rotated between the upper and lower supports to provide circulating cooling air while condensing vapor therein to provide a liquid coolant to be used for cooling purposes on the aircraft.

9. A jet propelled propeller-type vapor condenser being between a pair of supports and being rotatably journaled thereto, a plurality of axially spaced fuel nozzles,
   means for supplying fuel to the nozzles,
   a collection housing,
   a cylindrical housing,
   an axial compressor having contrarotating blades being rotatably connected to the interior of the cylindrical housing,
   means to supply air to the compressor,
   a radial turbine within the cylindrical housing and being suitably attached to the compressor to rotate the compressor,
   said radial turbine having hollow contrarotating turbine blades having nozzles thereon,
   a fuel supply manifold communicating with the interior of some of the hollow turbine blades,
   a compressed air supply manifold communicating with the interior of the other hollow turbine blades,
   said fuel manifold feed passage being in communication with fuel nozzles to receive fuel therefrom,
   said compressed air manifold being in communication with the compressor exit to receive compressed air therefrom,
   combustion chambers being formed by the cylindrical housing adjacent to the entrance of the turbine and between the turbine blades,
   means to feed fuel and compressed air to the combustion chambers,
   means forming a fuel passage, means communicating the fuel nozzles with said fuel passage, means to direct compressed air from the condenser through the fuel passage, a plurality of hollow propeller blades affixed to and radially extending from the cylindrical housing and being connected thereto to receive combustion gases from the turbine, an exhaust nozzle connected to the housing to receive gases from the fuel passage, a plurality of condenser housings interconnecting the ends of adjacent propeller blades, said condenser housings having condenser plates therein, means to direct gases from the hollow propeller blades into the condenser housings, a plurality of delivery conduits connected between the condenser housings and the collection housing to deliver condensed vapor therefrom to the collection housing, and said exhaust nozzle having means to provide a combustion chamber to ignite fuel and air therein with the combustion gases being exhausted through the exhaust nozzle to rotate the hollow propeller blades whereby the entire propeller-type condenser is rotated between the upper and lower supports to provide circulating cooling air while condensing vapor therein to provide a liquid coolant to be used for cooling purposes on the aircraft.

References Cited by the Examiner

UNITED STATES PATENTS

| | | | |
|---|---|---|---|
| 1,071,180 | 8/13 | Remington | 60—31 X |
| 1,987,604 | 1/35 | Corbett. | |
| 2,673,696 | 3/54 | Pullin et al. | 244—117.1 |
| 3,120,274 | 2/64 | Irbitis | 170—135.4 |

JULIUS E. WEST, *Primary Examiner.*

EDGAR W. GEOGHEGAN, *Examiner.*